3,215,156
FLUID PRESSURE SUPPLY SYSTEM FOR VEHICLE PUSH-START CONTROL SYSTEM
Michael A. De Corte, Scottsdale, Ariz., and Robert O. Dameron, Detroit, and Robert P. Zundel, Wayne, Mich., assignors to Ford Motor Company, Dearborn, Mich., a corporation of Delaware
Original application Oct. 7, 1957, Ser. No. 688,526, now Patent No. 3,103,831, dated Sept. 17, 1963. Divided and this application Jan. 7, 1963, Ser. No. 249,685
14 Claims. (Cl. 137—87)

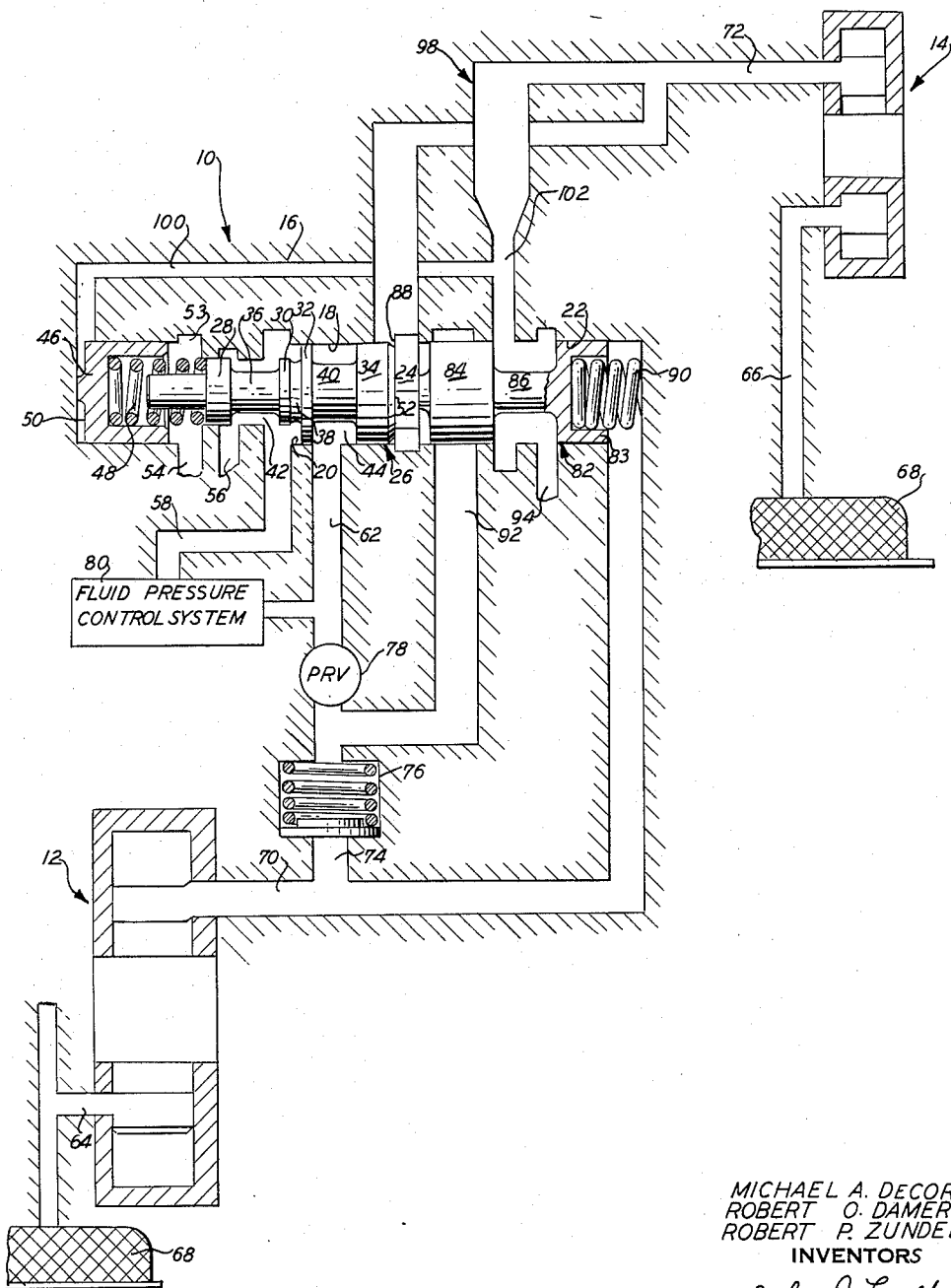

The invention relates to a fluid pressure control apparatus, and more particularly to one for use in a fluid pressure control system for a motor vehicle automatic transmission.

Automatic transmissions in use today generally establish different speed ratios by selectively engaging or disengaging a number of fluid pressure operated torque transmitting devices, such as clutches and brakes. These devices are generally supplied or exhausted of fluid under pressure from a control system having a number of shift valves operable in response to changes in vehicle speed and/or movement of the accelerator pedal to selectively establish one or more speed ratios.

Such a control system is shown, for example, in United States application S.N. 688,526, De Corte et al., Automatic Power Transmission Control, filed October 7, 1957, now Patent No. 3,103,831 granted September 17, 1963, of which this is a divisional application wherein engine and transmission output shaft driven pumps supply fluid under pressure through slidable shift valves to a number of clutch and brake servos. The shift valves are acted upon and moved to condition the transmission for a higher speed ratio by a hydraulic governor signal pressure which varies as a function of the change in vehicle speed as indicated by the output shaft pump speed and a governor mechanism.

In this type of control system, the front or engine driven pump generally supplies all the requirements for the control system during all normal operating phases. The rear or output shaft driven pump is generally of a smaller capacity and supplies fluid to the governor mechanism except in the event of an engine failure or stall; in which case, the rear pump takes over to supply the entire requirements of the fluid pressure control system. This prevents the transmission clutch and brake servos from being exhausted, which would normally place the transmission in a neutral condition of operation.

If a push-start of a vehicle is desired, the apparatus must be constructed to enable the clutch and brake servos to be supplied with fluid so that a drive can be established from the transmission output shaft back to the engine. In the particular transmission referred to above, a push-start can be obtained when the control system is conditioned for the lowest forward speed driver ratio. Therefore, it is desirable that the push-start mechanism overrule the action of the governor so that the governor signal pressure will not cause the control system shift valves to move to change the transmission drive range before the engine is cranked. The invention accomplishes this by rendering the hydraulic governor mechanism conditioned for a zero output pressure until the engine driven pump becomes operative to supply the requirements of the fluid pressure control system.

Therefore, it is an object of the invention to provide a push-start control apparatus for an automatic transmission comprising valving constructed not only to supply the general control system with operating fluid, but also to render the hydraulic governor apparatus inoperable to upshift the transmission to a range not permitting a push-start.

It is a further object of the invention to provide an automatic transmission push-start control system including engine and vehicle driven pumps normally supplying fluid to the control system and to a hydraulic governor mechanism which operates to provide a signal pressure varying as a funtcion of the change in vehicle speed. The governor mechanism includes a governor valve and a push-start valve in axially aligned end-to-end relationship, the governor valve normally regulating fluid pressure supplied thereto in accordance with vehicle speed changes to provide the governor signal pressure for upshifting the transmission shift valves, while the push-start valve is operable to change the supply of main line fluid pressure from the engine driven pump to the vehicle driven pump and render the regulating function of the governor valve inoperative so long as a push-start is required.

It is a still further object of the invention to provide a transmission of the type described with a control system having means enabling a push-start of the vehicle.

Other objects, features and advantages of the invention will become apparent upon reference to the succeeding detailed description thereof and to the drawing illustrating the preferred embodiment thereof.

The figure shows a combinaiton hydraulic governor and push-start control valve assembly 10 controllably supplied with operating and control fluid under pressure from a pair of fluid pumps 12 and 14.

More specifically, assembly 10 includes a valve body 16 having a longitudinal bore 18 divided into two connected chambers 20 and 22 by a spoke-like stationary stop member 24. Chamber 20 contains a slidable spool type governor valve 26 having a pair of spaced lands 28 and 30 of the same diameter, and a pair of lands 32 and 34 of equal larger diameter. A differential area thus exists between lands 30 and 32. The lands are interconnected by neck portions 36, 38, and 40 of reduced diameter providing annular fluid pressure chambers 42 and 44.

An annular hollow plug 46 closes one end of the bore 18 and is separated from land 28 by a compression spring 48 biasing valve 26 against the stop 24. The area of the face 50 of the plug is equal to the effective area of the beveled face 52 of land 34. Both chamber 53, defined by the annular space between plug 46 and land 28, and chamber 42 are connected to fluid exhaust or vent passages 54 and 56. The line 58 communicating with the space between lands 30 and 32 constitutes the governor output signal pressure line, and depending upon the position of the valve, can be vented past land 30 to line 56, or supplied with fluid from chamber 44 past land 32.

Chamber 44 receives fluid from a pressure line 62 supplied from either of the two pumps 12 and 14. Both pumps are of a known variable capacity type, pump 14 normally having a smaller capacity. Pump 12 is adapted to be driven from the engine of a motor vehicle, while pump 14 is driven from the transmission output shaft, by connections not shown. The pumps have inlets 64 and 66 connected to a fluid sump 68, and deliver fluid under varying pressures into outlet lines 70 and 72.

The front pump line 70 connects to a main line 74 containing a one-way check valve 76 and a known type of pressure regulator valve indicated schematically by the block 78. The one-way check valve prevents flow of fluid into pump 12 from pump 14 when pump 12 is inoperative. The line 74 supplies main line fluid under pressure to line 62 and also to an automatic transmission fluid pressure control system indicated by the block 80. The control system contains a number of shift valves and other valves, shown and described in detail in United States S.N. 688,526, referred to previously.

Since the details of the control system are unnecessary for an understanding of the invention, they are not described. Suffice it to say, however, that the shift valves are urged in one direction in a known manner by the governor pressure in line 58. They move individually upon the attainment of different predetermined governor pressures from positions directing the main line pressure from line 62 to one set of clutch and brake servos to establish one drive range of the transmission, to other positions directing main line pressure to other clutch and brake servo combinations to condition the transmission for a different higher speed drive range.

Front pump line 70 is also connected directly to the end of valve bore 18 to act on one end of a dual spool push-start valve 82. The valve is slidably mounted in the bore and has lands 83 and 84 of the same diameter spaced by a neck portion 86 of reduced diameter. The valve is acted upon at its opposite end by fluid under pressure from rear pump line 72 admitted to the space 88 between governor valve 26 and valve 82. The land 83 is recessed for containing a compression spring 90 maintaining the valve against stop 24 when both fluids under pressure act on the valve. In the position shown, land 84 blocks communication between the fluid under pressure in the space 88 and a branch line 92 connected to main pressure line 74. This position of the valve also establishes communication between an exhaust or vent line 94 and the fluid discharged from a venturi 98. The venturi has an intake side connected directly to rear pump output line 72. A passage 100 connects the static pressure in the throat section 102 of the venturi to the end of plug 46 to urge the governor valve against stop 24 by means of spring 48.

The total pressure from pump 14 admitted to space 88 will therefore act on land 34 and urge it in a left-hand direction, while the static pressure in throat sections 102 of the venturi will act on plug 46, which through spring 48 will urge land 28 in a right-hand direction. Since the total pressure in the region of the venturi section is equal to the sum of the static and velocity pressures, the force differential acting on the governor valve will therefore be equal to that force which is due to the velocity pressure. The greater force on land 34 will therefore initially move valve 26 to open communication between chamber 44 and line 58. As the pressure builds up in line 58, the force acting against the differential area between lands 30 and 32 will increase until it is sufficient to move land 32 to close communication between line 58 and chamber 44, at which time the pressure in passage 58 will equal the velocity pressure in the region of the venturi section. A further rise in pressure in line 58 over the differential force on the valve moves lands 30 and 32 to crack open the communication of line 58 to exhaust line 56, thereby lowering the pressure in line 58 until it is again equal to the velocity pressure. Further increases or decreases in total pressure from the rear pump with changes in speed will therefore control the communication between line 58 and chamber 44 and line 56 to establish different pressure levels for each change.

Thus, it will be seen that the governor signal pressure in passage 58 is a modulated control pressure, the magnitude of which is equal to the velocity pressure in the region of the venturi. This pressure therefore increases or decreases progressively with the changes in vehicle speed as indicated by the change in output of the pump 14. This pressure is therefore useful to control the movement of the shift valves of an automatic transmission control system in accordance with changes in vehicle speed.

In operation, with the vehicle stationary and the engine idling, rear pump 14 is stationary, and no pressure exists in line 72. Spring 48 therefore seats governor valve 26 against stop 24 and land 32 blocks communication between chamber 44 and governor signal pressure line 58. Spring 90 seats push-start valve 82 against seat 24 blocking line 92. Front pump 12 is rotating at engine speed producing fluid under pressure in line 70 to aid spring 90 to maintain the push-start valve in the position shown. The fluid under pressure in line 70 opens check valve 76 and passes through pressure regulator valve 78, where it is regulated to the desired pressure level in a known manner. The fluid fills branch lines 62 and 92 and chamber 44.

Assuming the transmission selective lever is placed in a forward drive position, the fluid in line 74 will then pass into the control system 80 and through the shift valves therein to the clutch and brake servos, which then apply the appropriate torque transmitting means to establish the lowest drive range called for by the selector lever position. As the vehicle begins to move, rear pump 14 will develop a pressure in line 72 proportionate to its speed. This pressure acts on land 34 and the static pressure in throat section 102 of venturi 98 will act on plug 46. The total pressure will also act on land 84 of push-start valve 82, but it is unable to shift the valve against the force of main line pressure in line 70 aided by the spring 90.

As soon as the friction of the system is overcome, the differential force on valve 26 moves the valve leftwardly to crack open communication between chamber 44 and line 58 and provide a pressure in line 58 equal to the velocity pressure in the region of venturi 98. The valve will then begin its regulating action providing a change in signal pressure in line 58 equal to the change in the velocity pressure in the venturi section 98 as the speed of pump 14 changes. This governor pressure is directed to the control system 80 to act on the shift valves and urge them to an upshifted position. At some predetermined vehicle speed, the governor pressure in line 58 will be sufficient to upshift a shift valve, and the main line pressure will then be directed from line 74 to a new combination of clutch and brake servos to establish a higher speed ratio drive. This process continues upon increase in vehicle speed until the highest speed ratio drive is obtained. Conversely, decreases in vehicle speeds will cause the transmission to be progressively downshifted because of the drop in governor signal pressure in line 58 as vehicle speed decreases.

It is to be noted that at no time is the pressure in space 88 against land 84 sufficient to move push-start valve 82 from the position shown so long as front pump pressure exists in line 70.

If, for some reason, the engine should stall or fail, the pressure from front pump 12 would immediately begin to decay, thus dropping the pressure in line 70 acting against the push-start valve 82, and in line 74 leading to the shift valves. The rear pump pressure in line 72 and space 88 therefore moves land 84 against the force of spring 90 to open communication between the rear pump line 72 and branch line 92. The flow into line 92 closes check valve 76 and immediately fills the requirements of the control system 80 to maintain the transmission conditioned for a drive from the output shaft back to the engine drive shaft. At the same time, the fluid vent line 94 of push-start valve 82 is blocked by land 84 so that the pressure of the fluid in the throat 102 of the venturi immediately rises to the total pressure level in line 72. Thus, the pressures acting on the effectively equal areas of land 34 and plug 46 are equal and in opposite directions, permitting spring 48 to seat valve 26 against stop 24. The communication between governor signal pressure outlet line 58 and chamber 44 is therefore blocked, and line 58 is vented through line 56.

Thus, as long as the push-start valve 82 is in an operative position, no pressure will exist in line 58, and the shift valves in control system 80 will downshift to their lowest drive position conditioning the transmission for its lowest forward speed drive. This will then enable the engine to be cranked. As soon as the engine begins operating again, the front pump fluid pressure in line 70, together with the force of spring 90, will again move push-start valve 82 to its inoperative position blocking branch line 92 and opening the discharge side of the venturi 98 to exhaust through line 94. Governor valve 26 will again be operative to provide a signal pressure in line 58 to upshift the valves to the positions indicated by the level of governor pressure attained. Check valve 76 again opens and control system 80 is supplied with fluid entirely from front pump 12.

It will be clear that substantially this same action occurs if the vehicle is stationary with the engine not operating, and a push-start of the vehicle is desired. The build-up in the pressure of pump 14 moves the push-start valve to condition the transmission for a low forward drive range, and prevents the normal operation of the governor valve 26.

While the invention has been illustrated in its prefered embodiment in the figure, it will be clear to those skilled in the arts to which the invention pertains that many changes and modifications may be made thereto without departing from the scope of the invention.

We claim:

1. A fluid pressure supply system including, in combination, a plurality of rotatable sources of fluid under varying pressures, a plurality of fluid supply lines, and conduit means connecting the fluid from said sources to said supply lines, said conduit means having fluid regulating means therein movable in response to fluid pressure from said sources acting thereon between positions controlling the communication of fluid to one of said supply lines, means biasing said regulating means to a non-regulating position, and other means movable into and out of said conduit means to control the fluid under pressure acting on said regulating means and the supply of fluid under pressure from one of said sources to said supply lines, means to move said other means, the movement of said other means out of said conduit means connecting said one source and said supply lines and controlling the fluid under pressure acting on said regulating means to effect movement of said regulating means to a position terminating the supply of fluid under pressure to said one supply line.

2. A fluid pressure supply system including, in combination, a plurality of rotatable sources of fluid under varying pressures, a plurality of fluid supply lines, and conduit means connecting the fluid from said sources to said supply lines, said conduit means having hydraulic governor means therein movable in response to fluid pressure from said sources acting thereon between positions controlling the communication of fluid to one of said supply lines, means biasing said governor means to a position interrupting communication of fluid to said one supply line, and other means movable into and out of said conduit means to control the fluid under pressure acting on said governor means and the supply of fluid from one of said sources to said supply lines, means to move said other means, the movement of said other means out of said conduit means connecting said one source and said supply lines and controlling the fluid under pressure acting on said governor means to effect movement of said governor means to a position terminating the supply of fluid under pressure to said one supply line.

3. A fluid pressure supply system including, in combination, a plurality of rotatable sources of fluid under pressure each producing an output fluid pressure that varies as a function of its respective speed of rotation, a plurality of fluid supply lines, and conduit means connecting the fluid from said sources to said supply lines, said conduit means having fluid pressure actuated fluid regulating means therein movable by fluid under pressure connected thereto from said sources and having an inlet supplied with fluid from said sources and an outlet connected to said inlet and to one of said supply lines, said regulating means being movable in response to pressure changes resulting from changes in speed of rotation of one of said sources for regulating the fluid in said outlet and said one line to provide a speed sensitive fluid signal pressure in said one supply line, means biasing said regulating means to a non-regulating position, and other means movable into and out of said conduit means to control the communication of fluid from said one source to said supply lines and inlet and to control the flow of fluid acting on said regulating means, means to move said other means, the movement of said other means out of said conduit means connecting said one source and said supply lines and controlling the fluid under pressure acting on said regulating means to effect movement of said fluid regulating means to a position terminating the supply of fluid under pressure to said one supply line.

4. A fluid pressure supply system including, in combination, a plurality of rotatable sources of fluid under pressure each producing an output fluid pressure that varies as a function of its respective speed of rotation, a plurality of fluid supply lines, and conduit means connecting the fluid from said sources to said supply lines, said conduit means having a hydraulic governor mechanism therein having an inlet supplied with fluid from said sources and an outlet connected to said inlet and to one of said supply lines, means connecting fluid at different pressures from one of said sources to different portions of said mechanism for moving said mechanism to regulate the fluid communication from said inlet to said outlet and said one line as a function of the pressure changes resulting from change in speed of rotation of said one source, means biasing said mechanism to a non-regulating position, and movable means in said conduit means movable by fluid under pressure from said sources and controlling the flow of actuating fluid to said mechanism and to said supply lines and inlet, said movable means in one position blocking the flow of fluid from said one source to said supply lines and inlet, said movable means being movable to a flow unblocking position in response to termination of operation of the remaining of said sources for maintaining fluid in the remaining of said supply lines, the movement to said unblocking position connecting said one source and said supply lines and controlling the fluid under pressure acting on said mechanism to effect movement of said governor mechanism to a position terminating the supply of fluid under pressure to said one supply line.

5. A fluid pressure supply system including, in combination, first and second rotatable sources of fluid under pressure each producing an output fluid pressure that varies as a function of its respective speed of rotation, a plurality of fluid supply lines, and conduit means connecting said sources to said supply lines, said conduit means having a hydraulic governor mechanism therein having an inlet supplied with fluid from said sources and an outlet connected to said inlet and to one of said supply lines, means connecting fluid at different pressures from a first one of said sources to different portions of said mechanism for moving said mechanism to regulate the fluid in said outlet and said one line as a function of the changes in fluid pressure resulting from changes in the speed of rotation of said first source, means biasing said mechanism to a non-regulating position, and movable means in said conduit means movable by fluid under pressure from said sources and controlling the flow of actuating fluid to said mechanism and to said supply lines and inlet, said movable means in one position blocking the flow of fluid from said first source to said supply lines and inlet, said movable means being movable to a flow unblocking position in response to termination of operation of the said second source for maintaining fluid in said supply lines, the movement to said unblocking position connecting said one source and said supply lines and controlling the fluid under pressure acting on said mechanism to effect movement of said governor mechanism to a position blocking its outlet thereby terminating the supply of fluid under pressure to said one supply line.

6. A fluid pressure control system including fluid distributor means for controlling the flow of a first fluid under pressure to a plurality of locations, said means being movable to one control position in response to the force of a second fluid under pressure acting thereon, first and second rotatable sources of fluid under pressure each producing an output fluid pressure that varies as a function of its respective speed of rotation, conduit means connecting the fluid from said sources to each other and to said distributor means, said conduit means having a movable hydraulic governor mechanism therein having an inlet supplied with fluid from said sources and an outlet connected to said inlet, said mechanism including movable valve means having different portions acted on by fluid at different pressures from said second source and movable in response thereto for regulating the communication of fluid from said inlet to said outlet as a function of the changes in fluid pressure resulting from changes in the speed of rotation of said second source to produce said second fluid under varying pressure in said outlet, means biasing said valve means to a non-regulating position, means connecting said second fluid to said distributor means to act thereon, and other movable valve means in said conduit means movable by fluid under pressure from said sources and controlling the flow of actuating fluid to said mechanism and to said supply lines and inlet, said movable means in one position blocking the flow of fluid from said second source to said inlet, said other valve means being movable to a flow unblocking position in response to termination of operation of said first source, the movement to said unblocking position connecting said one source and said supply lines and controlling the fluid under pressure acting on said first valve means to effect movement of said first valve means to a position blocking its outlet thereby terminating the supply of said second fluid under pressure to said distributor means.

7. A fluid pressure supply system including, in combination, first and second rotatable sources of fluid under pressure each producing an output fluid pressure that varies as a function of its respective speed of rotation, a plurality of fluid supply lines, and conduit means connecting said sources to said supply lines, said conduit means having a hydraulic governor mechanism therein, said mechanism including a valve body having a bore and a valve movable in said bore, said bore having an inlet supplied with fluid from said sources and an outlet connected to said inlet and to one of said supply lines, said conduit means connecting fluid at different pressures from a first one of said sources to different portions of said valve for moving said valve to regulate the fluid in said outlet and said one line as a function of the speed of the changes in fluid pressure resulting from changes in the speed of rotation of said first source, means biasing said valve to a non-regulating position, and other means in said conduit means movable by fluid under pressure from said sources and controlling the flow of fluid to said supply lines and inlet and the flow of fluid to move said valve, said other means being movable to a position blocking the flow of fluid from said first source to said supply lines and inlet and movable to a flow unblocking position in response to termination of operation of the said second source for maintaining fluid in said supply lines, the movement to said unblocking position connecting said one source and said supply lines and controlling the fluid under pressure acting on said valve to effect movement of said valve to a position blocking its outlet and terminating the supply of fluid under pressure to said one supply line.

8. A fluid pressure supply system including, in combination, first and second rotatable sources of fluid under pressure each producing an output fluid pressure that varies as a function of its respective speed of rotation, a plurality of fluid supply lines, and conduit means connecting said sources to said supply lines, said conduit means having a hydraulic governor mechanism therein, said mechanism including a valve body having a bore and a valve movable in said bore, said bore having an inlet supplied with fluid from said sources and an outlet connected to said inlet and to one of said supply lines, said conduit means including a fluid pressure reducing means associated with one of said sources, means connecting fluid at the pressure of said one source to one end of said valve and fluid at the reduced pressure to the opposite end of said valve to move said valve and regulate the fluid in said outlet and said one line as a function of the changes in fluid pressure resulting from changes in the speed of rotation of said one source, means biasing said valve to a non-regulating position, and other means in said conduit means movable by fluid under pressure from said sources and controlling the flow of fluid to said supply lines and inlet and the flow of fluid to move said valve, said other means being movable to a position blocking the flow of fluid from said first source to said supply lines and inlet and movable to a flow unblocking position in response to termination of operation of the said second source for maintaining fluid in said supply lines, the movement to said unblocking position rendering said pressure reducing means inoperable to reduce the pressure to said one end of said valve thereby effecting movement of said valve to a position blocking its outlet thereby terminating the supply of fluid under pressure to said one supply line.

9. A fluid pressure supply system including, in combination, first and second rotatable sources of fluid under pressure each producing an output fluid pressure that varies as a function of its respective speed of rotation, a plurality of fluid supply lines, and conduit means connecting said sources to said supply lines, said conduit means having a hydraulic governor mechanism therein, said mechanism including a valve body having a bore and a valve movable in said bore, said bore having an inlet supplied with fluid from said sources and an outlet connected to said inlet and to one of said supply lines, said conduit means connecting fluid at different pressures from a first one of said sources to different portions of said valve for moving said valve to regulate the fluid in said outlet and said one line as a function of the changes in fluid pressure resulting from changes in the speed of rotation of said first source, means biasing said valve to a non-regulating position, and other valve means in said bore movable by fluid under pressure from said sources and controlling the flow of fluid to said supply lines and inlet and the flow of fluid to move said valve, said other means being movable to a position blocking the flow of fluid from said first source to said supply lines and inlet and movable to a flow unblocking position in response to termination of operation of the said second source for maintaining fluid in said supply lines, the movement of said other valve means to said unblocking position connecting said one source and said supply lines and controlling the fluid under pressure acting on said valve to effect movement of said valve to a position blocking its outlet thereby terminating the supply of fluid under pressure to said one supply line.

10. A fluid pressure supply system including, in combination, first and second rotatable sources of fluid under pressure each producing an output fluid pressure that varies as a function of its respective speed of rotation, a plurality of fluid supply lines, and conduit means connecting said sources to said supply lines, said conduit means having a hydraulic governor mechanism therein, said mechanism including a valve body having a bore and a valve movable in said bore, said bore having an inlet supplied with fluid from said sources and an outlet connected to said inlet and to one of said supply lines, said conduit means connecting fluid at different pressures from a first one of said sources to different portions of said valve for moving said valve to regulate the fluid in said outlet and said one line as a function of the changes in fluid pressure resulting from changes in the speed of rotation of said first source, and valve means in said bore controlling the flow of fluid from said first source to said supply lines and inlet and controlling the flow of fluid to move said valve, said valve means being biased in opposite directions to positions in or out of said conduit means by fluid from said sources acting on opposite ends thereof, said valve means being movable to a position blocking the flow of fluid from said first source to said supply lines and inlet and movable to a flow unblocking position in response to termination of operation of the said second source for maintaining fluid in said supply lines, the movement to said unblocking position connecting said one source and said supply lines and controlling the fluid under pressure acting on said valve to effect movement of said valve to a position blocking its outlet thereby terminating the supply of fluid under pressure to said one supply line.

11. A fluid pressure supply system including, in combination, first and second rotatable sources of fluid under pressure each producing an output fluid pressure that varies as a function of its respective speed of rotation, a plurality of fluid supply lines, and conduit means connecting said sources to said supply lines, said conduit means having a hydraulic governor mechanism therein, said mechanism including a valve body having a bore and a first valve movable in said bore, said bore having an inlet supplied with fluid from said sources and an outlet connected to said inlet and to one of said supply lines, said conduit means including a fluid pressure reducing means associated with one of said sources, means connecting fluid at the pressure of said one source to one end of said valve and fluid at the reduced pressure to the opposite end of said valve to move said valve to regulate the fluid in said outlet and said one line as a function of the changes in fluid pressure resulting from changes in the speed of rotation of said one source, means biasing said valve to a non-regulating position, and a second valve in said bore, said second valve being biased in opposite directions to positions in or out of said conduit means by fluid from said sources acting on opposite ends thereof, said second valve being movable to a position blocking the flow of fluid from said first source to said supply lines and inlet and movable to a flow unblocking position in response to termination of operation of the said second source for maintaining fluid in said supply lines, the movement of said second valve to said unblocking position rendering said pressure reducing means inoperable to reduce the pressure to said one end of said first valve and effecting movement of said first valve to a position blocking said outlet thereby terminating the supply of fluid under pressure to said one supply line.

12. A fluid pressure supply system including, in combination, first and second rotatable sources of fluid under pressure each producing an output fluid pressure that varies as a function of its respective speed of rotation, a plurality of fluid supply lines, and conduit means connecting said sources to said supply lines, said conduit means having hydraulic governor means therein, said means including a valve body having a bore, a pair of axially adjacent valves in said bore in end to end relationship, said conduit means communicating fluid from the first of said sources to the adjacent ends of said valves for moving said valves in opposite directions, other means connecting the opposite ends of said valves each to a different source of fluid and at different pressures for moving said valves towards each other, means biasing a first of said valves towards the other valve, said bore having an inlet supplied with fluid from said sources and an outlet connected to said inlet and to one of said supply lines, movement of said first valve by said fluid pressures regulating the fluid in said outlet and said one line as a function of the changes in fluid pressure resulting from changes in the speed of rotation of said first source, the fluid in said outlet biasing said first valve to close said outlet, said conduit means including a portion of said bore connecting said inlet to said first source of fluid, means biasing the other valve to a position blocking communication of fluid to said inlet from said first source, said other valve moving in response to the fluid pressure thereon from said first source upon interruption of supply of fluid from said second source to communicate fluid from said first source to said supply lines, the latter movement of said other valve controlling the flow of fluid for moving said first valve and thereby effecting movement of said first valve to a position blocking its outlet and terminating the supply of fluid under pressure to said one supply line.

13. A fluid pressure supply system including, first and second rotatable sources of fluid under varying pressures, first and second valves connected to said sources and each movable by fluid under pressure from said sources acting thereon, a fluid pressure supply line conected to said first valve, said first valve regulating the flow of fluid from said sources to said supply line, means biasing said first valve to a non-regulating position, said second valve being movable by said fluid under pressure from said sources to positions controlling both the supply of fluid to be regulated and the flow of actuating fluid to said first valve from one of said sources, said second valve being movable by the one source fluid under pressure upon termination of supply of fluid from the other of said sources to a position controlling the fluid under pressure acting on said first valve to thereby effect a movement of said first valve to a fluid non-regulating position.

14. A control valve unit comprising, first and second sources of fluid under pressure, first conduit means connecting said sources, second conduit means connected to said first source and being open to exhaust, flow restriction means in said second conduit means, a supply line connected to said second conduit means downstream of said restriction means to contain fluid at a lower pressure than the pressure of said one source, valve means movable into and out of said first and second conduit means for interrupting or permitting communication of fluid between said sources and for interrupting or permitting the exhaust of fluid through said second conduit means, said valve means being movable in opposite directions in response to fluid under pressure from said sources acting on opposite ends of said valve means, means biasing said valve means towards a first conduit blocking position and a second conduit unblocking position, the termination of supply of fluid from said second source effecting a movement of said valve means to supply said first conduit means with fluid from said first source and to block the exhaust of fluid from said second conduit means thereby rendering said flow restriction means inoperative and raising the pressure in said supply line.

References Cited by the Examiner
UNITED STATES PATENTS 2,875,643  3/59  Kelley _____ 74—645
3,004,446  10/61  Flinn.

MARTIN P. SCHWADRON, *Primary Examiner.*

UNITED STATES PATENT OFFICE
CERTIFICATE OF CORRECTION

Patent No. 3,215,156 November 2, 1965

Michael A. De Corte et al.

It is hereby certified that error appears in the above numbered patent requiring correction and that the said Letters Patent should read as corrected below.

Column 7, line 50, strike out "the speed of".

Signed and sealed this 19th day of July 1966.

(SEAL)
Attest:

ERNEST W. SWIDER
Attesting Officer

EDWARD J. BRENNEI
Commissioner of Patents